United States Patent
Loga et al.

(10) Patent No.: US 6,871,666 B1
(45) Date of Patent: Mar. 29, 2005

(54) BI-DIRECTIONAL DUAL CHAMBER ORIFICE FITTING

(75) Inventors: Thomas Henry Loga, Houston, TX (US); Archie Dodd Begg, Houston, TX (US); William R. Freund, Jr., Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 10/848,884

(22) Filed: May 19, 2004

(51) Int. Cl.[7] .................. F15D 1/02; F16K 47/10; G01F 1/42
(52) U.S. Cl. .................. 137/601.18; 73/861.52; 73/861.61; 73/861.62; 137/2; 137/8; 137/599.11; 137/599.13; 137/601.2; 137/601.21; 138/44; 138/94; 138/94.3
(58) Field of Search .................. 73/861.52, 861.61, 73/861.62, 861.63; 137/1, 2, 8, 599.11, 599.13, 601.2, 601.21, 15.18, 110, 115.01, 115.03, 115.09, 315.01, 601.18, 601.19; 138/44, 94, 94.3; 251/282, 281

(56) References Cited

U.S. PATENT DOCUMENTS

| | | | |
|---|---|---|---|
| 1,058,092 A | 4/1913 | Pew et al. .............. | 73/861.61 |
| 1,698,314 A | 1/1929 | Mapelsden .............. | 73/861.61 |
| 1,996,192 A | 4/1935 | Daniel .................. | 137/315.29 |
| 2,127,501 A | 8/1938 | Dall ..................... | 73/861.61 |
| 2,217,216 A | 10/1940 | Davis .................. | 138/44 |
| 2,306,940 A | 12/1942 | Fischer .................. | 73/861.61 |
| 2,626,820 A | 1/1953 | Dons et al. ............ | 73/861.61 |
| 2,942,465 A | 6/1960 | Frishman .............. | 138/44 |
| 3,381,532 A | 5/1968 | Tausch .................. | 137/599.11 |
| 3,822,592 A | 7/1974 | Siegel et al. .......... | 138/44 |
| 4,191,216 A | 3/1980 | Connolly | |
| 4,307,745 A | 12/1981 | McGee | |
| 4,444,224 A | 4/1984 | Geisow | |
| 4,478,251 A | 10/1984 | Sanchez et al. | |
| 4,633,911 A | 1/1987 | Lohn | |
| 4,682,757 A | 7/1987 | Shelton | |
| 4,750,370 A | 6/1988 | Ossyra .................. | 73/861.61 |
| 5,069,252 A | 12/1991 | Kendrick et al. | |
| 5,085,250 A | 2/1992 | Kendrick | |
| 5,181,542 A | 1/1993 | Wass et al. | |
| 5,305,796 A | 4/1994 | Klak | |
| 5,318,073 A | 6/1994 | Kendrick et al. | |
| 5,474,103 A | 12/1995 | Klak .................... | 73/861.61 |
| 5,836,356 A * | 11/1998 | Desai .................. | 138/44 |
| 5,967,166 A | 10/1999 | Carter | |
| 6,164,142 A * | 12/2000 | Dimeff .................. | 73/861.61 |
| 6,324,917 B1 * | 12/2001 | Mack et al. .......... | 73/861.61 |
| 6,467,504 B1 | 10/2002 | Bonicontro .......... | 137/601.2 |

OTHER PUBLICATIONS

FMC Measurement Solutions; FMC Energy Systems; Bulletin POR0001.00 Issue/Rev. 0.0(7.01); (10 pp.).

\* cited by examiner

*Primary Examiner*—George L. Walton
(74) *Attorney, Agent, or Firm*—Conley Rose, P.C.

(57) ABSTRACT

Methods and apparatus for a bi-directional dual chamber orifice fitting comprising a body with a chamber in fluid communication with a flow bore. The fitting also comprises an orifice supported by an orifice plate carrier that is selectably disposable in the bore. In the preferred embodiment, the lower chamber includes two passageways connecting the chamber to the flow bore. One passageway is located on either side of the orifice plate. Each passageway may also be equipped with a check valve to permit flow in only one direction through the passageway. In operation, the passageway on the upstream side of the orifice would allow fluid to flow into the lower chamber while the passageway on the downstream side would prevent flow back into the flow bore.

10 Claims, 4 Drawing Sheets

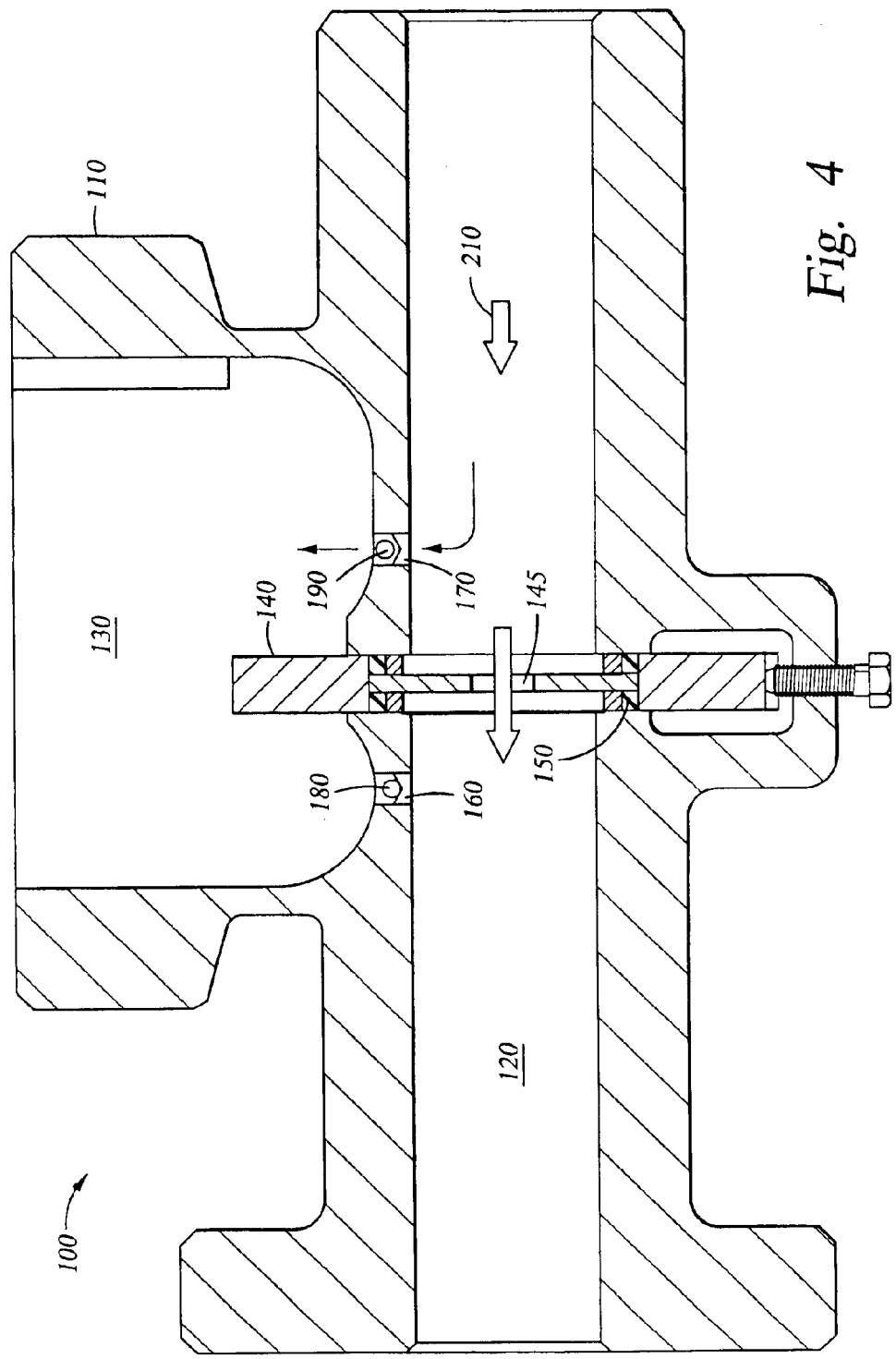

BI-DIRECTIONAL DUAL CHAMBER ORIFICE FITTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to methods and apparatus for monitoring characteristics of a flow stream in a pipeline, in particular to dual chamber orifice fittings. More precisely, the embodiments of the invention relate to dual chamber orifice fittings supporting fluid flow in two directions.

In pipeline operations and other industrial applications, flow meters are used to measure the volumetric flow rate of a gaseous or liquid flow stream moving through a piping section. Flow meters are available in many different forms. One common flow meter is an orifice meter, which includes an orifice fitting connected to the piping section. The orifice fitting serves to orient and support an orifice plate that extends across the piping section perpendicular to the direction of flow stream. The orifice plate is generally a thin plate that includes a circular opening, or orifice, that is typically positioned concentric with the flow stream.

In operation, when the flow stream moving through the piping section reaches the orifice plate, the flow is forced through the orifice, thereby constricting the cross-sectional flow area of the flow. Due to the principles of continuity and conservation of energy, the velocity of the flow increases as the stream moves through the orifice. This velocity increase creates a pressure differential across the orifice plate. The measured differential pressure across the orifice plate can be used to calculate the volumetric flow rate of the flow stream moving through the piping section.

A dual chamber orifice fitting embodies a special design that enables the orifice plate to be removed from the fitting without interrupting the flow stream moving through the piping section. This specially designed fitting has been known in the art for many years. U.S. Pat. No. 1,996,192, hereby incorporated herein by reference for all purposes, was issued in 1934 and describes an early dual chamber orifice fitting. Fittings with substantially the same design are still in use in many industrial applications today. Although the design has remained substantially unchanged, operating conditions continue to expand and dual chamber fittings are now available for a wide range of piping sizes and working pressures.

A cross-sectional view of common dual chamber orifice fitting 12 is illustrated in FIG. 1. Orifice fitting 12 includes body 16 and top 18. Body 16 encloses lower chamber 20, which is in fluid communication with the bore 34 of pipeline. Top 18 encloses upper chamber 22 and is connected to body 16 by bolts 17. Aperture 30 defines an opening connecting upper chamber 22 to lower chamber 20. Valve seat 24 is connected to top 18 by bolts 28 and provides a sealing engagement with slide valve plate 56, which is slidably actuated by rotating gear shaft 54. Lower drive 36 and upper drive 38 operate to move orifice plate carrier 32 vertically within fitting 12 between lower chamber 20 and upper chamber 22. Orifice plate carrier 32 can be removed from fitting 12 through upper chamber 22 by loosening bolts 46, which engage locking bar 44 to compress sealing bar 40 and sealing gasket 42 against top 18.

In operation, as shown in FIG. 1, aperture 30 is closed by slide valve plate 56 hydraulically isolating upper chamber 22 and lower chamber 20. Pressurized fluid flow in bore 34 passes through orifice 52, which is located on an orifice plate 50 supported by orifice plate carrier 32 that sealingly engages the wall of bore 34. If lower chamber 20 has a lower pressure than bore 34, the pressure in bore 34 will tend to urge orifice plate carrier 32 upward and into lower chamber 20, potentially causing misalignment between orifice 52 and bore 34 that can decrease measurement accuracy.

In order to counter the pressure differential described above some of these fittings include an equalization flow path 60 between the lower chamber and the bore that allows pressure to equalize across the orifice plate carrier. This equalization flow path 60 is generally located upstream of the orifice so as to located in the region of highest pressure within the bore. Because many dual chamber orifice fittings are configured to operate with flow moving in only one direction, the equalization fluid path is often positioned upstream of the orifice. In some applications, such as metering for bulk storage facilities, it may be desirable to be able to operate an orifice fitting with flow in either direction through the fitting, in order to measure the alternating flow into and out of the facility. If the equalization flow path is downstream from the orifice the pressure in the bore at the flow path location may be less than the pressure in the bore that acts on the orifice plate carrier, creating a pressure differential across the carrier and urging the carrier into the lower chamber.

Therefore, there remains a need in the art for a bi-directional dual chamber orifice fitting that provides for pressure equalization across the orifice plate carrier. Thus, the embodiments of the present invention are directed to bi-directional dual chamber orifice fittings that seek to overcome these and certain other limitations of the prior art.

SUMMARY OF THE PREFERRED EMBODIMENTS

The preferred embodiments include methods and apparatus for a bi-directional dual chamber orifice fitting comprising a body with a chamber in fluid communication with a flow bore. The fitting also comprises an orifice supported by an orifice plate carrier that is selectably disposable in the bore. In the preferred embodiments, the lower chamber includes two passageways connecting the chamber to the flow bore. One passageway is located on either side of the orifice plate. Each passageway may also be equipped with a check valve to permit flow in only one direction through the passageway. In operation, the passageway on the upstream side of the orifice would allow fluid to flow into the lower chamber while the passageway on the downstream side would prevent flow back into the flow bore.

In one embodiment an orifice fitting comprises a body having a flow bore and a chamber adjacent to the flow bore. An orifice plate is supported in alignment with the flow bore by an orifice plate carrier that is exposed to the chamber. A first passageway provides fluid communication between the flow bore and the chamber and is on a first side of the orifice plate. A second passageway provides fluid communication between the flow bore and the chamber and is on a second side of the orifice plate. In certain embodiments, check valves are disposed within the first and second passageways so as to only allow fluid communication from the flow bore into the chamber. With the check valves installed, fluid flow through the flow bore in a first direction will flow through the first passageway but not the second passageway and fluid flow through the flow bore in a second direction will flow through the second passageway but not the first passageway. In select embodiments, the orifice fitting further comprises a valve providing fluid communication between the chamber and the flowbore only when the pressure within the chamber exceeds the pressure within the flowbore.

In another embodiment, a method for equalizing the pressure against an orifice plate exposed to the lower chamber and the flow bore of a dual chamber orifice fitting, the method comprises providing fluid communication through a first passageway between the flow bore and the chamber on a first side of the orifice plate; and providing fluid communication through a second passageway between the flow bore and the chamber on a second side of the orifice plate. In certain embodiments, the method further comprises providing check valves disposed within the first and second passageways so as to only allow fluid communication from the flow bore into the chamber. The check valves act such that fluid flow through the flow bore in a first direction will flow through the first passageway but not the second passageway and fluid flow through the flow bore in a second direction will flow through the second passageway but not the first passageway. The method may also comprise providing fluid communication between the chamber and the flowbore when the pressure within the chamber exceeds the pressure within the flowbore.

In another embodiment a body for housing an orifice plate comprises a chamber and a bore disposed adjacent to the chamber. The body also includes an orifice plate aperture connecting the chamber to the bore, wherein the orifice plate aperture is closed when the orifice plate is disposed within the bore. A first passageway and a second passageway connect the chamber to the bore. The aperture is located between the first passageway and the second passageway. The first and second passageways are operable to maintain a pressure balance between the chamber and the bore. The body may also include check valves disposed within the first and second passageways so as to only allow fluid to flow from the bore into the chamber. In other embodiments the body may include a pressure relief valve in fluid communication with the chamber so as to relieve pressure from the chamber if the pressure in the bore is less than the pressure within the chamber.

Thus, the embodiments of present invention comprise a combination of features and advantages that enable substantial enhancement of the operation of dual chamber orifice fittings. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein:

FIG. 4 is a partial cross-sectional view of the bi-directional dual chamber orifice fitting of FIG. 2 showing flow in a second direction.

DETAILED DESCRIPTION OF THE PREFERRED EMBODIMENTS

Figure 1:
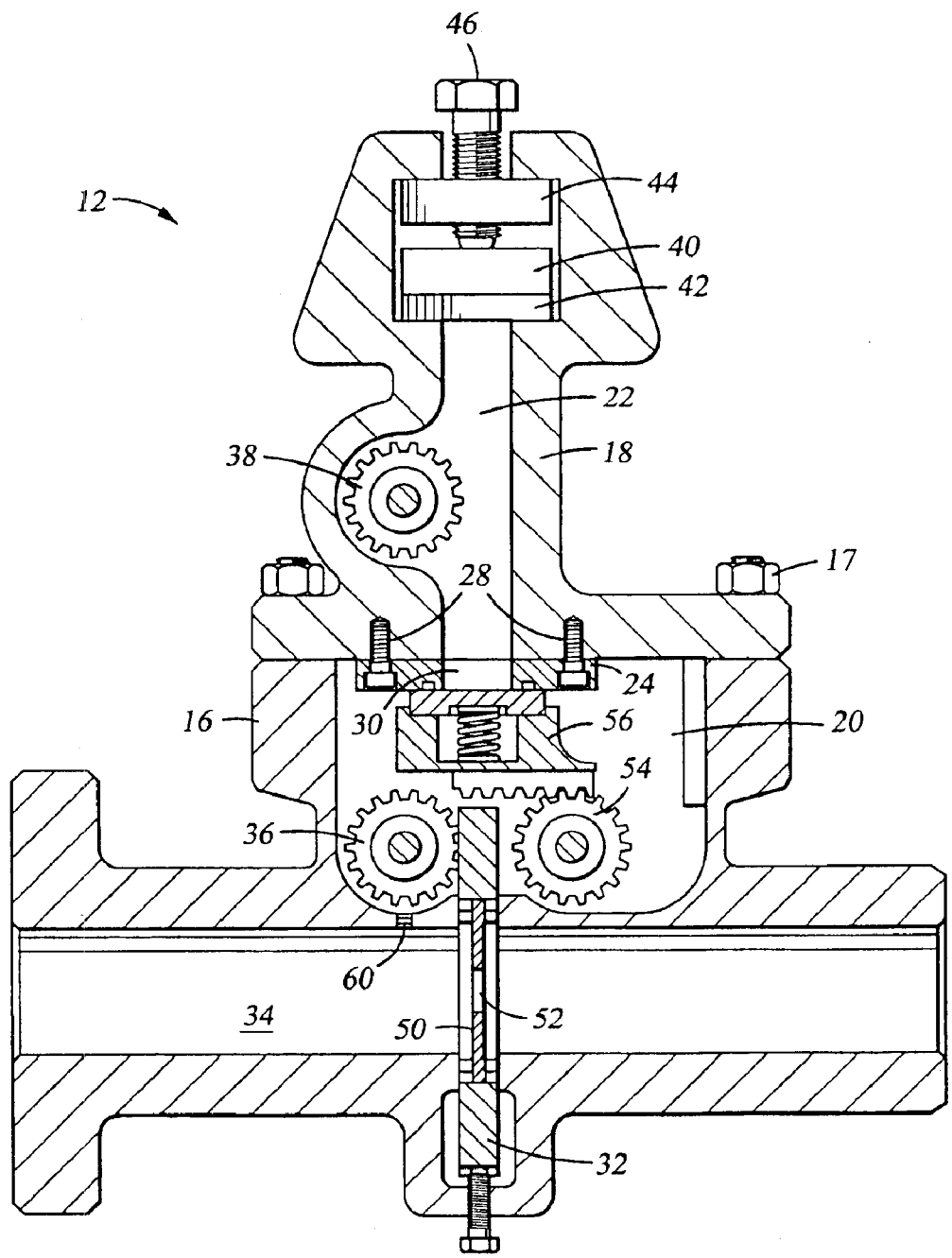
FIG. 1 is a cross-sectional view of a prior art dual chamber orifice fitting.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 2:
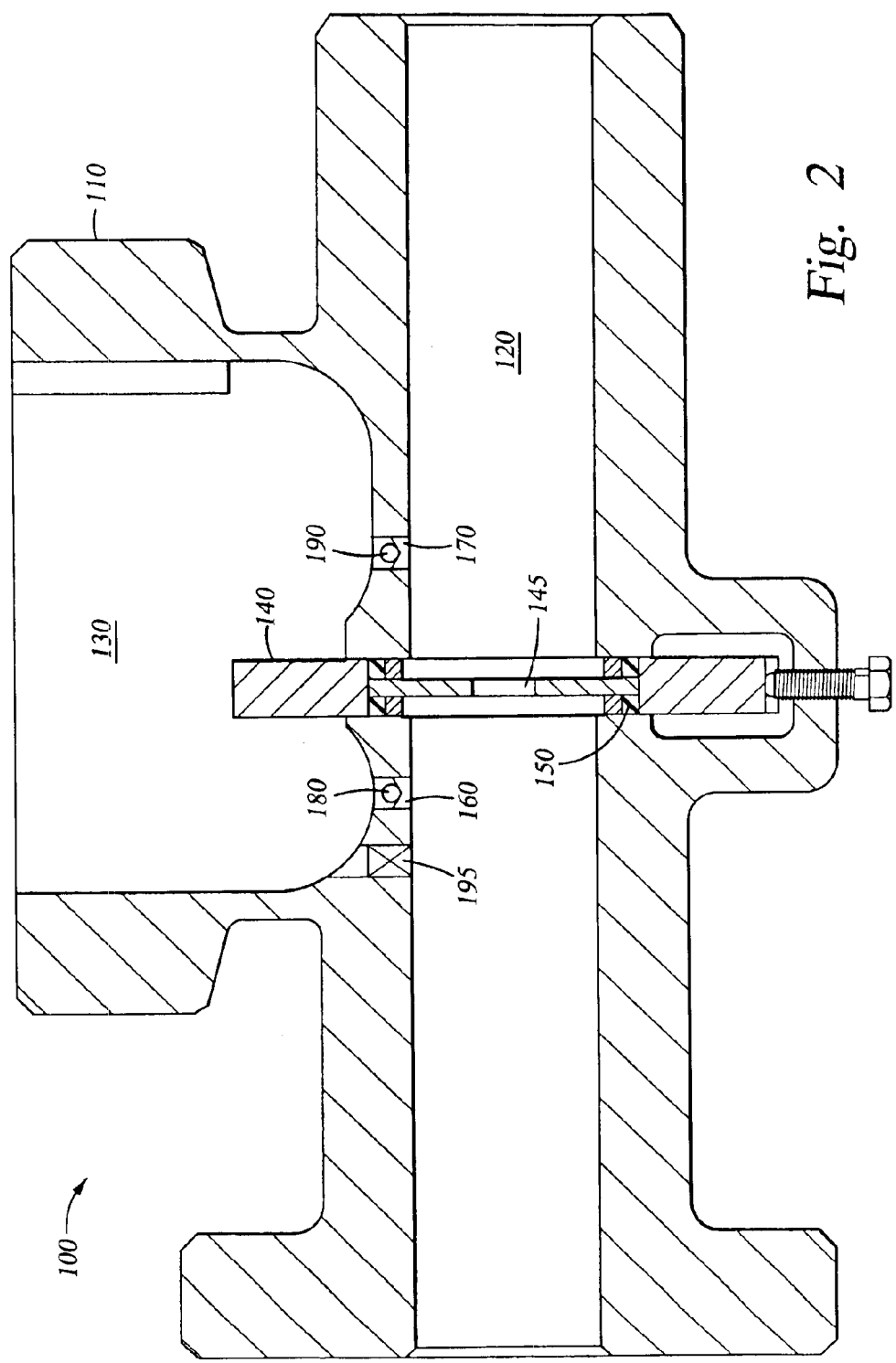
FIG. 2 is a partial cross-sectional view of one embodiment of a bi-directional dual chamber orifice fitting in accordance with the present invention.

Referring now to FIG. 2, a partial cross-sectional view of an orifice fitting 100 having body 110 is shown containing bore 120 and lower chamber 130. An orifice plate carrier 140 supports orifice 145 in alignment with bore 120. Seals 150 prevent leakage between orifice plate carrier 140 and bore 120. Passageways 160 and 170 provide fluid communication between lower chamber 130 and bore 120 when orifice plate carrier 140 is sealed in place. Check valves 180 and 190 are connected to passageways 160 and 170, respectively, and allow fluid communication only from bore 120 into lower chamber 130. Check valves 180 and 190 do not allow fluid flow from lower chamber 130 to bore 120. Check valves 180, 190 may be of any suitable construction as selected by one of ordinary skill in the art.

Fitting 100 may also include relief valve 195 to provide fluid communication between bore 120 and lower chamber 130 when the pressure in the lower chamber is higher than the pressure in the bore. Relief valve 195 is configured such that as the pressure within bore 120 is reduced, fluid trapped in lower chamber 130 will flow back into the bore. Relief valve 195 is selected to be closed during normal operation and only allow fluid flow once pressure in bore 120 is reduced significantly, such as would happen of flow through bore 120 was stopped. Relief valve 195 thus prevents high pressure fluid from becoming trapped in lower chamber 130 as pressure within bore 120 is reduced. Relief valve 195 may preferably be placed at the maximum distance from orifice 145. In certain embodiments, an alternate relief valve may be provided to vent any pressure within lower chamber 130 to outside fitting 100 and not back into bore 120.

Figure 3:
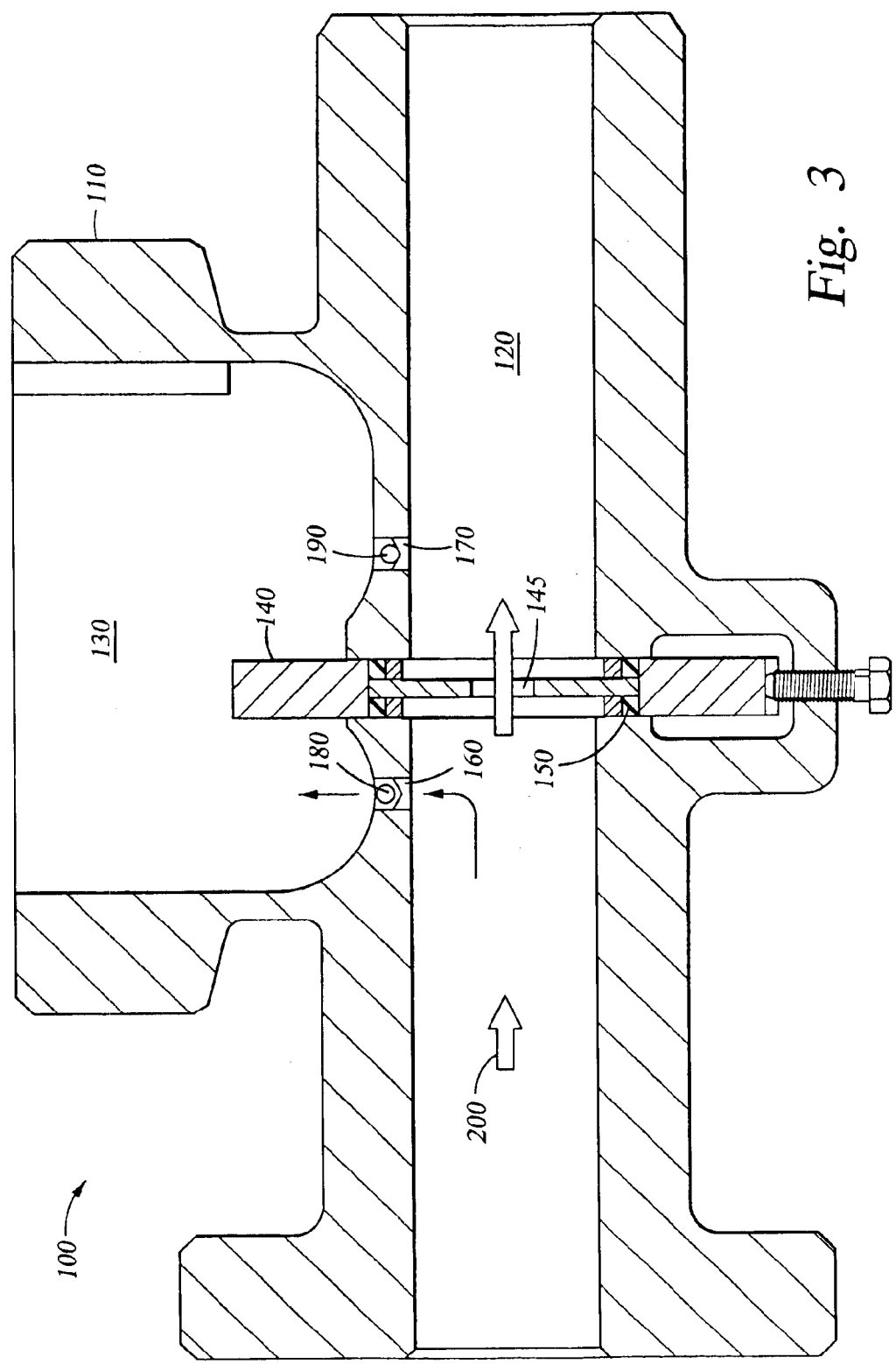
FIG. 3 is a partial cross-sectional view of the bi-directional dual chamber orifice fitting of FIG. 2 showing flow in a first direction.

Referring now to FIG. 3, body 110 is shown supporting fluid flow in a direction indicated by arrow 200. By virtue of flow through orifice 145, the fluid pressure is higher on the upstream side of the orifice than on the downstream side. As the fluid approaches orifice 145, a portion of the fluid will flow through valve 180 and passageway 160 into lower chamber 130. Valve 190 prevents the fluid from flowing through passageway 170 back into bore 120. With fluid able to flow across passageway 160, the pressure in lower chamber 130 will equalize with the pressure in bore 120 and eliminate any pressure differential created forces that may move orifice plate carrier 140 out of alignment with bore 120.

Referring now to FIG. 4, body 110 is shown supporting fluid flow in the direction indicated by arrow 210, opposite the flow direction shown in FIG. 3. As with flow in the opposite direction, there is a pressure drop across orifice 145. As the fluid approaches orifice 145, a portion of the fluid will flow through valve 190 and passageway 170 into lower chamber 130. Valve 180 prevents the fluid from flowing through passageway 160 back into bore 120. With fluid able to flow across passageway 170, the pressure in lower chamber 130 will equalize with the pressure in bore 120 and eliminate any pressure differential created forces that may move orifice plate carrier 140 out of alignment with bore 120.

Once the pressure within bore 120 is reduced, pressure will be trapped inside lower chamber 130 by check valves 180 and 190. It is preferred that the residual pressure within lower chamber 130 be relieved before the fitting is opened to the atmosphere. In certain embodiments, this residual pressure can be released to atmosphere through a vent (not shown) in body 110. This release may happen automatically or by manual or control system intervention by opening a valve. In alternate embodiments, body 110 may include automatically opening valves, such as relief valve 195, to allow fluid to flow from the lower chamber 130 back into bore 120. In other embodiments, check valves 180 and 190 may also be reversible or otherwise switchable check valves that can be opened to allow fluid flow opposite the normal direction of operation.

By providing a providing a pressure equalization flow path on either side of the orifice 145, the meter can operate with flow moving in either direction. Restricting the flow of fluid into and out of the lower chamber with check valves, or other uni-directional valves, requires no manual interface when switching the flow direction. Thus, the preferred embodiments are especially useful in applications where the direction of fluid flow may change frequently and it is desirable to fully measure the flow in each direction.

The preferred embodiments of the invention relate to a bi-directional dual chamber orifice fitting. The present invention is susceptible to embodiments of different forms. There are shown in the drawings, and are described in detail, specific embodiments of the invention with the understanding that the present disclosure is to be considered an exemplification of the principles of the invention, and is not intended to limit the invention to that illustrated and described herein. In particular, various embodiments of the invention provide a number of different arrangements to improve operation of the fitting. The use of the concepts of the invention is not limited to the described applications, and can be used for any other applications including other dual chamber fittings and orifice fittings. It is to be fully recognized that the different teachings of the embodiments discussed below may be employed separately or in any suitable combination to produce desired results.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. An orifice fitting comprising:
    a body;
    a flow bore through said body;
    a chamber in said body adjacent to said flow bore;
    an orifice plate supported in alignment with said flow bore by an orifice plate carrier, wherein the orifice plate carrier is exposed to said chamber;
    a first passageway providing fluid communication between said flow bore and said chamber, wherein said first passageway is on a first side of said orifice plate;
    a second passageway providing fluid communication between said flow bore and said chamber, wherein said first passageway is on a second side of said orifice plate;
    check valves disposed within said first and second passageways so as to only allow fluid communication from said flow bore into said chamber; and
    a valve providing fluid communication between said chamber and said flowbore only when the pressure within said chamber exceeds the pressure within said flowbore.

2. The orifice fitting of claim 1 wherein fluid flow through said flow bore in a first direction will flow through said first passageway but not said second passageway.

3. The orifice fitting of claim 1 wherein fluid flow through said flow bore in a second direction will flow through said second passageway but not said first passageway.

4. The orifice fitting of claim 1 wherein the orifice plate carrier is selectably disposable in said bore or said chamber.

5. A method for equalizing the pressure against an orifice plate exposed to the lower chamber and the flow bore of a dual chamber orifice fitting, the method comprising:
    providing fluid communication through a first passageway between the flow bore and the chamber on a first side of the orifice plate;
    providing fluid communication through a second passageway between the flow bore and the chamber on a second side of said orifice plate; and
    selectably providing fluid communication between the chamber and the flowbore when the pressure within the chamber exceeds the pressure within the flowbore.

6. The method of claim 5 further comprising providing check valves disposed within the first and second passageways so as to only allow fluid communication from said flow bore into said chamber.

7. The method of claim 5 wherein fluid flow through the flow bore in a first direction will flow through the first passageway but not the second passageway.

8. The method of claim 5 wherein fluid flow through the flow bore in a second direction will flow through the second passageway but not the first passageway.

9. A body for housing an orifice plate, the body comprising:
    a chamber;
    a bore disposed adjacent to said chamber;
    an orifice plate aperture connecting said chamber to said bore, wherein said orifice plate aperture is closed when the orifice plate is disposed within said bore;
    a first passageway connecting said chamber to said bore;
    a second passageway connecting said chamber to said bore, wherein said aperture is located between said first passageway and said second passageway;
    check valves disposed within said first and second passageways so as to only allow fluid to flow from said bore into said chamber; and
    a pressure relief valve in fluid communication with said chamber so as to relieve pressure from said chamber if the pressure in said bore is less than the pressure within said chamber.

10. The body of claim 9 wherein said pressure relief valve is operable to selectably allow fluid to flow from said chamber into said bore.

* * * * *